March 29, 1966     T. I. PRZYSIECKI     3,243,031
BRAILLE PAGE EMBOSSER Filed Sept. 16, 1964     9 Sheets-Sheet 1

INVENTOR
THEODORE I. PRZYSIECKI
BY R. C. Terry
ATTORNEY

March 29, 1966  T. I. PRZYSIECKI  3,243,031
BRAILLE PAGE EMBOSSER
Filed Sept. 16, 1964  9 Sheets-Sheet 2

FIG. 2

March 29, 1966 T. I. PRZYSIECKI 3,243,031
BRAILLE PAGE EMBOSSER
Filed Sept. 16, 1964 9 Sheets-Sheet 3

United States Patent Office 3,243,031
Patented Mar. 29, 1966

3,243,031
BRAILLE PAGE EMBOSSER
Theodore I. Przysiecki, Dunedin, Fla., assignor to Teletype Corporation, Skokie, Ill., a corporation of Delaware
Filed Sept. 16, 1964, Ser. No. 396,971
7 Claims. (Cl. 197—6.1)

This invention relates to Braille writers and more particularly to tape controlled embossing machines for preparing pages of Braille copy.

In the past Braille copy has been prepared on machines which have six keys, one corresponding to each of the six positions in the Braille cell. The operator of such a machine selects the key or keys corresponding to each Braille cell to be embossed and depresses them simultaneously. The keys are individually connected to a set of embossing pins which cooperate with a die block to form the embossments in a web. Many of these machines employ a stationary embossing pin and die block assembly and a traveling paper carriage, these parts being arranged similarly to a typewriter. This arrangement limits the length of the web which may be embossed because the web must be moved across its entire width to accomplish line spacing for the Braille copy.

Attempts have been made at simplifying the generation of pages of Braille copy. Typically these attempts have centered around reducing the knowledge of Braille required by the operator rather than simplifying and improving the Braille writer itself. Solenoids have been used to operate the key levers of the Braille writer and the solenoids have been driven by the outputs of keyboards. These keyboards have had displayed on their keytops the various characters, numerals and contractions of Braille language and the depression of the keytops has caused te closing of contacts. When the contacts are closed, power is supplied to the solenoids and the Braille cell corresponding to the character displayed on the keytop of the keyboard is embossed on the web. Although machines of this type do simplify the generation of pages of Braille copy considerably they do not overcome the basic problems inherent in this type of Braille writer because the Braille writer itself is not altered except for inclusion of electromagnets for operating the embossing pins.

Accordingly an object of this invention is to provide a tape controlled Braille writer.

A further object of this invention is to provide a Braille writer which has a stationary paper platen and a traveling embossing pin actuating mechanism.

Another object of this invention is to provide a Braille writer which assures that the embossments it produces are of uniform height.

According to the preferred embodiment of this invention these objects are achieved by providing a traveling embossing pin actuating mechanism which contains a set of six interposer members, one being individual to each position in the Braille cell. Upon receipt of a character representing electrical impulses six electromagnetically controlled vanes permutatively release one or more of the interposer members which are spring driven into the path of a power bail. As the power bail moves it strikes those interposer members which have been released and causes them to push, through a series of links, their corresponding embossing pins into the web and against a die block thus causing a Braille cell to be embossed in the web. The power bail does not strike those interposer members which have not been released and the embossing pins corresponding to those interposer members are not raised. The power bail travels a distance greater than is necessary to effect embossing and the links which transfer the motion of the power bail to the embossing pins are designed to absorb the excess motion thereby assuring a full seating of each embossing pin in the die block without the necessity of accurate and delicate adjustments in the link assembly. Character spicing is effected in the device by moving the embossing pin actuating assembly an amount equal to the width of a Braille cell after each embossing operation. The web is advanced step-by-step to effect line spacing for Braille copy.

A more thorough understanding of the present invention may be had by referring to the following detailed description and by referring to the drawings wherein.

Figure 1:
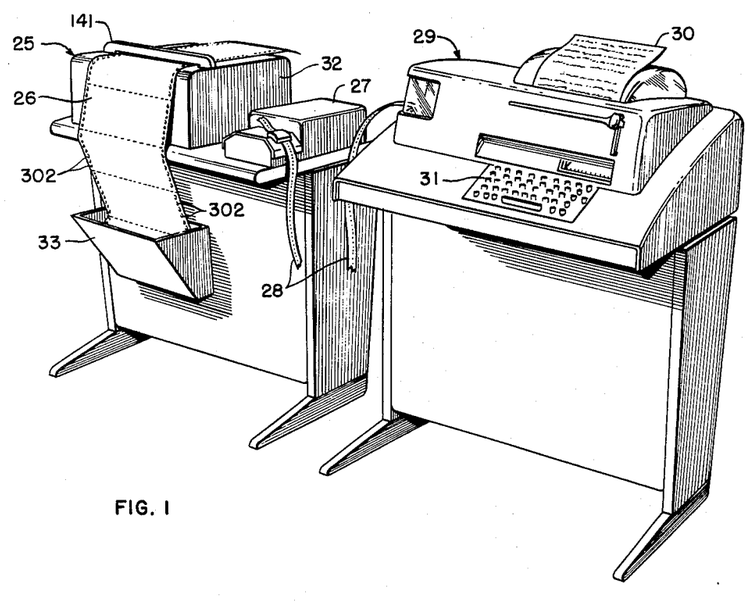
FIG. 1 is a perspective view of a Braille preparation system which utilizes the present invention.

Referring now to the drawings wherein like reference characters designate the same parts throughout the several views, particular reference being had to FIG. 1, it will be seen that the apparatus of the present invention is comprised primarily of a Braille page embosser designated generally by the numeral 25 and is designed to prepare page copy of Braille on a manifold type of web 26. The embosser 25 operates under control of a tape reader 27 which may be of any of the currently available types of tape readers but which is preferably of the type described in the patent to W. P. Byrnes, No. 3,021,388, granted February 13, 1962. The tape reader 27 reads permutation code combinations of holes in a paper tape 28 prepared on a tape preparation machine such as that designated generally by the numeral 29 which in addition to preparing perforated tape prints a monitor copy 30 under control of a keyboard 31.

Any type of keyboard controlled tape perforator may be used, however, a perforator of the type disclosed in Burcky, Patent No. 2,190,309, granted February 13, 1940, is preferred. Similarly, any of the many page printers currently available may be employed; however, the preferred mechanism is that described in W. J. Zenner, Patent No. 2,505,729, granted April 25, 1950. By using such mechanisms a monitor copy in ordinary type may be provided for proofreading purposes to check the accuracy of the information recorded in the tape 28 prior to the feeding of the tape to the tape reader 27.

Preferably the printing telegraph apparatus as just described will be equipped with a keyboard such as that shown in the copending application of W. H. Pagenkopf, Serial No. 363,712, filed April 30, 1964. With such an apparatus, information encoded in the tape 28 may simultaneously be transmitted telegraphically to a distant tape perforator which could then prepare tape for use by the reader such as the reader 27 to control an embossing apparatus such as the embossing apparatus 25 at a distant location. The type pallets of the monitor copy portion of the tape preparation machine 29 preferably bear characters which represent the various contractions of Grade II Braille. When the perforator and the printer are arranged in this manner the preparation of a punched paper tape 28 which carries permutation code combinations representative of the Braille copy to be produced and a printed proofchecking monitor copy may be generated with a minimum of difficulty. Thus, when an operator is using the present system she reads from the copy to be reproduced in Braille and depresses the key of the keyboard 31 as if she were typing the copy. The keyboard controlled perforator 27 causes the information to be punched into paper tape and the printer 29 causes the copy to be produced in printed form on pages of paper which may in turn be proofchecked against the original. The web 26 which is to be embossed may be fed, from any suitable receptacle such as receptacle 33, over the top of a cabinet 32 forming a part of the embossing mechanism 25 and after being embossed may be fed downwardly into a suitable receptacle. Webs such as the web 26 are perforated transversely so that as the web is fed from the receptacle 33 it will be fed over cabinet 32 and it will fold and may be later torn into separate sheets for binding in a book.

Power for driving the embosser 25 and its various components is derived from a continuously driven motor 34 (FIG. 5) which drives a pinion 35. The motor 34 is mounted within the cabinet 32 and its pinion 35 is in mesh with a drive gear 36 that is fixed to and drives a countershaft 37 on which there is fixed a drive pinion 38 shown in full in FIG. 7 and in dot and dash lines in FIG. 5. The countershaft 37 is mounted for free rotation in a bracket 39 that is mounted in spaced relation to a base plate 40 on which all of the operating parts of the embosser 25 are supported. The base plate 40 has a pair of side plates 41 and 42 extending upwardly from it in which there is freely rotatably mounted a main drive shaft 43 to which there is fixed a main drive gear 44 that is in mesh with and driven by the drive pinion 38. Thus, the main drive shaft 43 is continuously driven and supplies power to drive all of the power actuated parts of the apparatus.

Figures 7, 10:
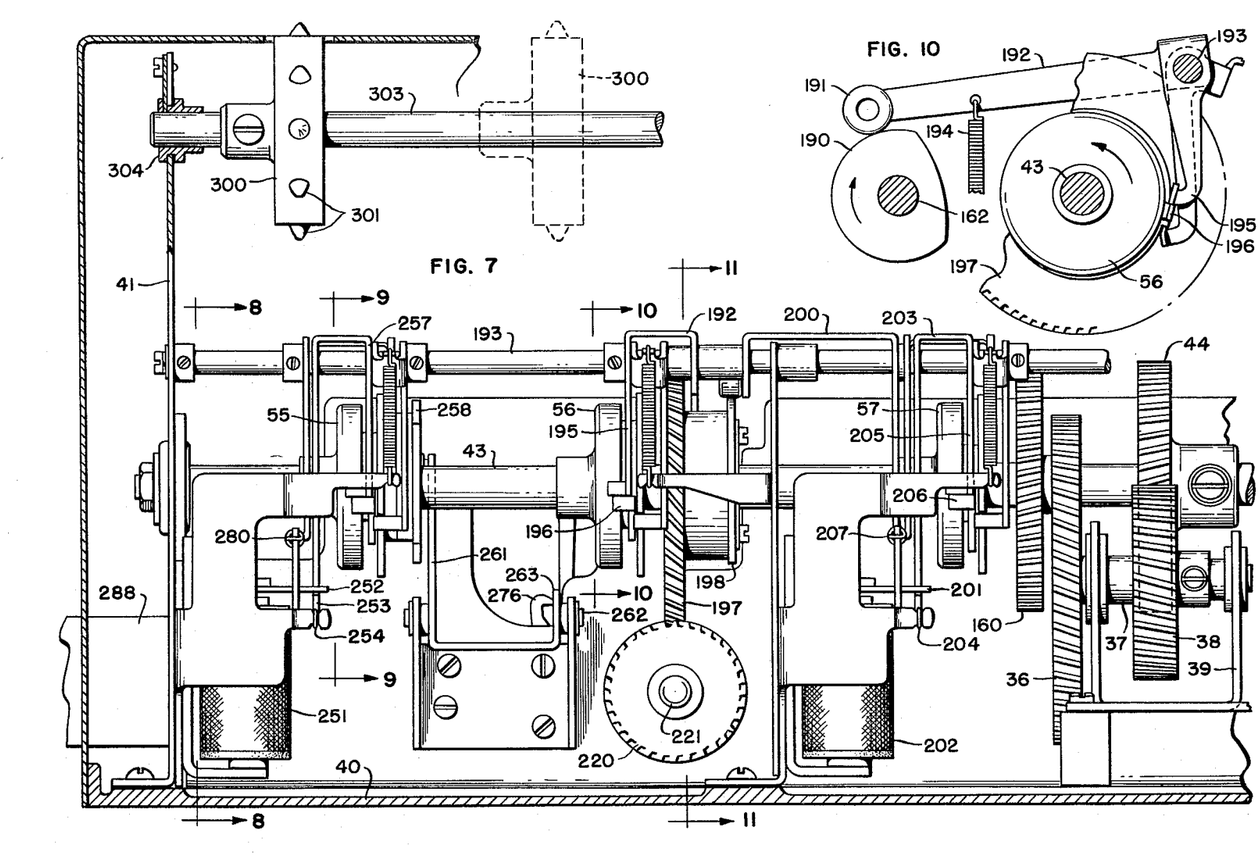
FIG. 7 is a rear elevational view of the apparatus in which the cover plates have been broken away to show details of construction of the invention in greater detail.
FIG. 10 is a fragmentary vertical sectional view taken substantially along the line 10—10 of FIG. 7 in the direction of the arrows and showing in particular the release mechanism for the spacing clutch.

A plurality of clutches 55, 56, 57 and 58 (FIGS. 5 and 7) are mounted on the main drive shaft 43 and serve selectively to drive various portions of the apparatus when the clutches are tripped. The clutch 55 controls the carriage return operating mechanism; the clutch 56 controls the spacing mechanism for the carriage, the clutch 57 controls the power bail operating mechanism, and the clutch 58 controls the line feed mechanism of the apparatus. Clutches 55 and 57 shown on FIG. 7 are magnetically operated, as is clutch 58 shown on FIG. 5, whereas the spacing clutch 56 is mechanically tripped. Clutches 55, 56, 57 and 58 are half-revolution clutches. These may be of any standard design but preferably are of the type disclosed in Patent No. 2,566,031, granted to A. N. Nilson on August 28, 1951.

SELECTOR MECHANISM

Figure 5:
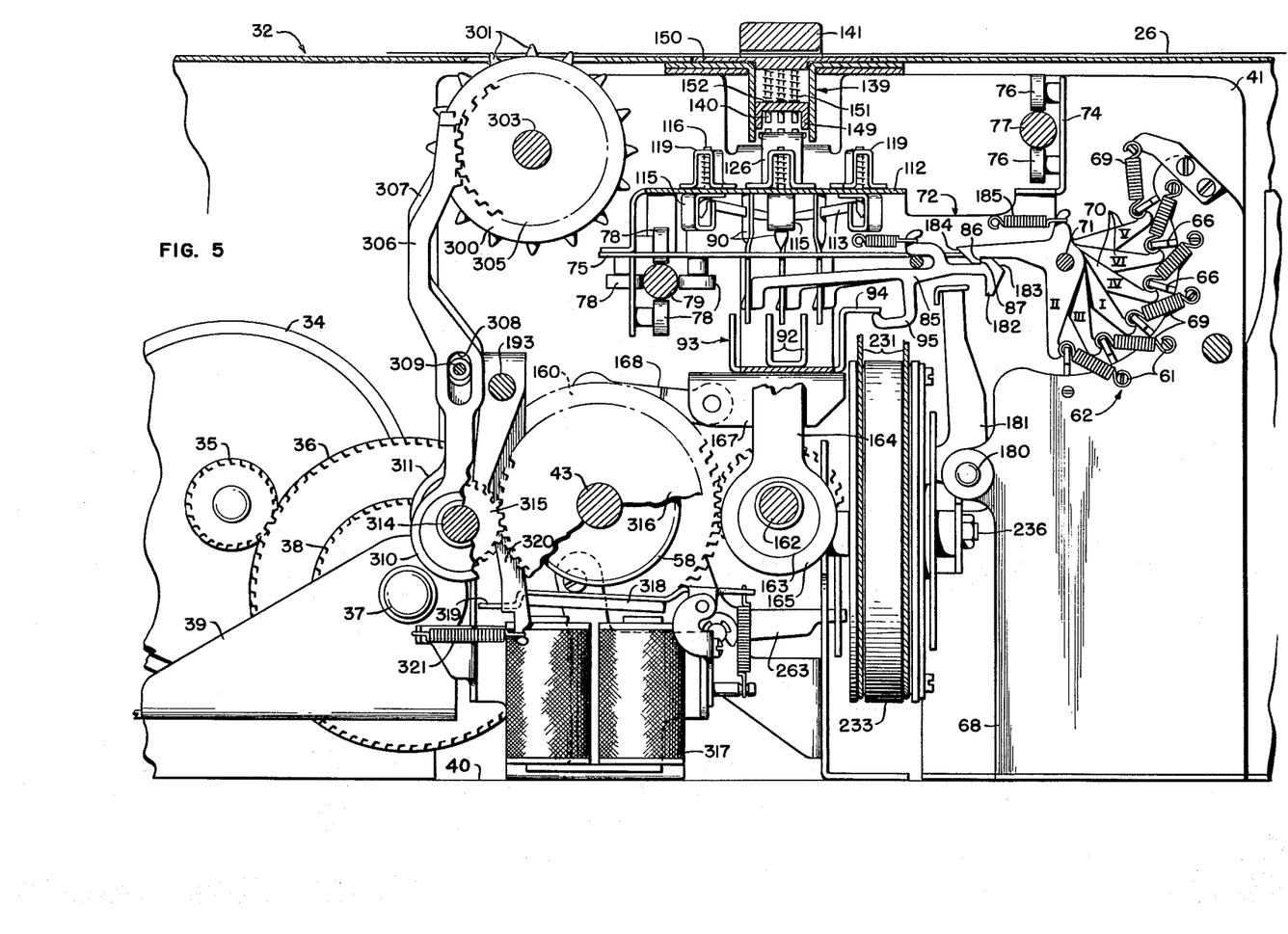
FIG. 5 is a vertical sectional view taken along the line 5—5 of FIG. 2 in the direction of the arrows, and showing in particular the line feed mechanism of the present invention.

A selector mechanism 62, as most clearly seen in FIGS. 2, 3, 5 and 6, receives the output of the tape reader 27 to selectively control the embossing of Braille cells on the web 26. This selector mechanism includes six electromagnets 63 (FIGS. 2, 3, and 6), three of which are mounted on one side of a middle support plate 64 and three of which are mounted on the opposite side of the support plate 64. The electromagnets 63 as well as other parts of the mechanism are individually assigned to one of the levels of the code read by the reader 27 and are, therefore, individual to one element of the Braille all to be embossed. All of the parts so assigned bear a Roman numeral indicative of the element of the cell to which they are assigned. The electromagnets 63 are arranged in a semicircle so that their respective armatures 65 are maintained in operative alignment in series with tiltable vanes 66 which are oscillatably mounted on pivot studs 61 fixed to a vertically extending plate 67 and a cooperating vertically extending plate 68 (FIGS. 2, 3, 5 and 6), the plates 67 and 68 being suitably attached to the base plate 40. The vanes 66 extend substantially all the way across the apparatus between the side plates 41 and 42 and are all spring urged to the positions shown in FIGS. 5 and 6 by a plurality of contractile springs 69. In the position of the vane 66 shown in FIGS. 5 and 6, the vanes will hold the armatures 65 of the electromagnets 66 away from the cores of their electromagnets. Consequently, upon energization of selected ones of the electromagnets 63 the vanes 66 will be rocked clockwise (FIG. 6), counterclockwise (FIG. 5) to rock latches 70 individual to them in a counterclockwise direction (FIG. 6) or clockwise direction as seen in FIG. 5.

Each of the electromagnets 63 (FIGS. 2, 3 and 6) is individually connected to one level of the output of the tape reader 27 so that when a permutation code signal is received from the tape reader 27 a permutative combination of the magnets 63 will be energized. Upon energization, each of the magnets so selected will cause its armature 65 to be attracted and thereby to be rocked counterclockwise (FIG. 6) about its associated pivot.

CARRIAGE MECHANISM

The latches 70 are pivotally mounted on a pivot shaft 71 which is carried in a carriage 72. The carriage 72 comprises a framework 73 (FIG. 6) having an upwardly extending plate 74 and a base 75. Plate 74 carries a pair of support rollers 76 for cooperation with a guide rod 77 and the base 75 carries three guide rollers 78 which ride on a guide rod 79. The guide rods 77 and 79 extend across the entire width of the apparatus and are suitably fixed in the side plates 41 and 42 for supporting the carriage 72 for movement across the web 26 to be embossed. Since the latches 70 are pivoted on the pivot shaft 71 which is in turn mounted on the carriage 72, the rounded ends of the latches 70 will slide along the vanes 66 as the carriage 72 is moved across the width of the apparatus so that in all positions of the carriage 72 the latches 70 will be under control of the vanes 66.

Upon the receipt by the electromagnet 63 of a permutation signal from the reader 27, the magnets will be individually energized and since each of the magnets is allocated to a separate embossment of the six embossments which make up a Braille cell, the energization of these magnets 63 will control the make up of the cell by operating the vanes 66 which in turn actuate the latches 70. The carriage 72 has mounted on it a guide post 84 which oscillatably and slidably supports six interposers 85 which are clearly shown in FIGS. 12 and 13. There is one interposer 85 aligned with each latch 70. In the unoperated condition of the apparatus a shoulder 86 on each latch 70 engages a latching shoulder 87 on its associated interposer 85 to hold the interposer 85 in the position shown in FIG. 12 against the biasing action of a plurality of springs 88 which are attached to and individual to each interposer 85, the right-hand end of the springs 88 (FIG. 12) being attached to a bracket 89 fixed on the base 75 of the carriage 72.

Figures 12, 13, 14A, 14B:
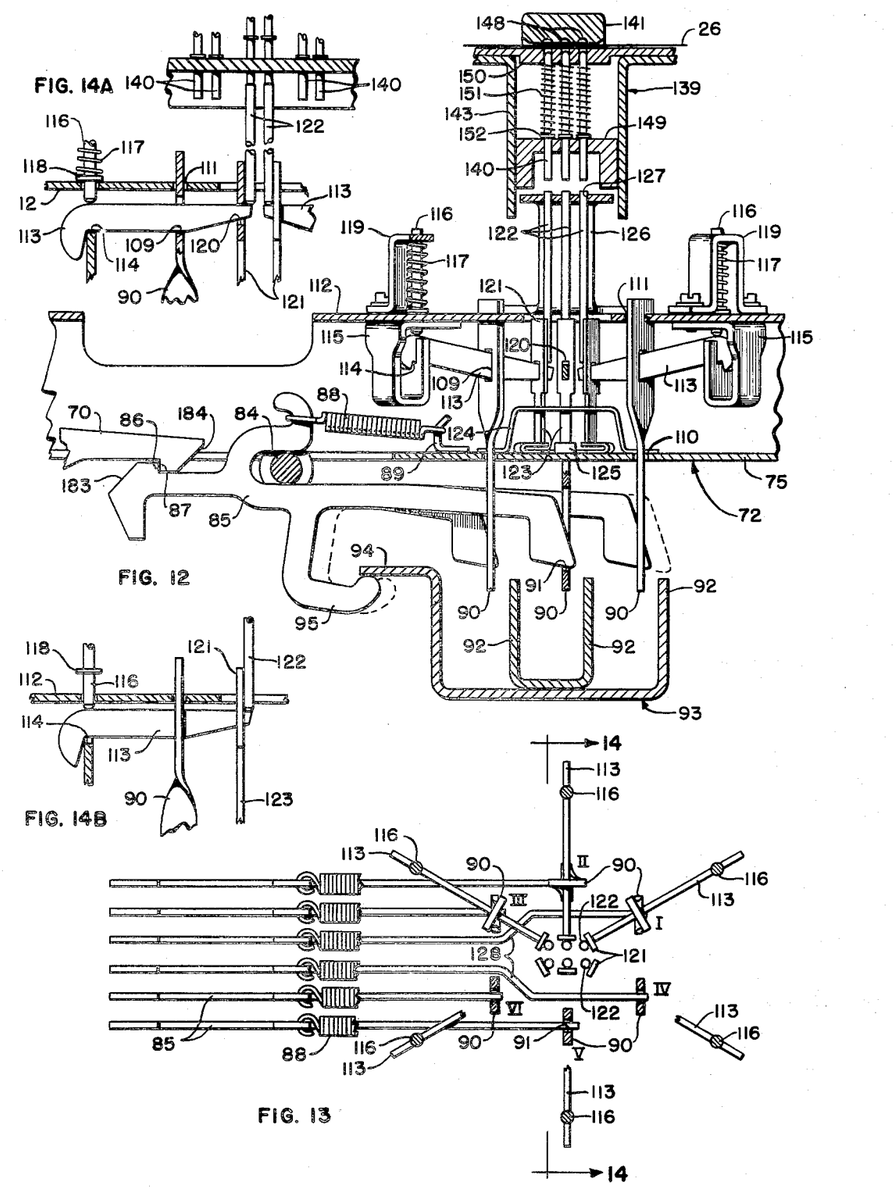
FIG. 12 is a fragmentary vertical sectional view taken substantially along the line 12—12 of FIG. 2 in the direction of the arrows, parts being broken away more clearly to illustrate features of the embossing pin selecting mechanism.
FIG. 13 is a relatively diagrammatic plan section taken substantially along the line 13—13 of FIG. 12 in the direction of the arrows to illustrate the arrangement of the mechanisms for selecting the embossing pins for operation.
FIG. 14a is a partial sectional view taken substantially along the line 14——14 of FIG. 13 in the direction of the arrows and showing the transfer links in a partially raised condition.
FIG. 14b is another view also taken along the line 14—14 of FIG. 13 in the direction of the arrows and showing the transfer links in fully raised position.

Each of the interposers 85 is of the same general configuration, the various ones being of different length and some of them being bent as indicated in FIG. 13. The right end of each interposer 85 extends into a vertical transfer member 90 which is provided with a slot 91 for receiving the downwardly extending right end of the interposer member 85. There is a vertical transfer member 90 associated with and individual to each of the interposers 85 and the slots 91 in the vertical transfer members 90 are proportioned to allow the downwardly extending right end of the interposers to move within the slots to the position indicated in the dotted lines in FIG. 12 thereby placing the upper surface of an interposer 85 in alignment with the upper end of the slot 91 and also placing the lower end of the downwardly extending right-hand portion of the interposers 85 in alignment with power bail projections 92 formed on a power bail 93. The power bail has a horizontally extending lip 94 which extends over a hook-shaped portion 95 on each of the interposers 85 whereby when the power bail 93 is moved to the position shown in FIG. 12 it will lower the interposers 85 to the position shown and will retract the vertical transfer members 90 to the position shown in FIG. 12. The base 75 of the carriage 72 is provided with a plurality of slots, such as the slots 110. The vertical transfer members 90 are twisted and their upper ends are guided in suitably positioned slots 111 formed in an upper plate 112 of the carriage 72. The vertical transfer members 90 are thus guided for reciprocation in the carriage under control of their respective interposers 85. It should be noted at this time that the bail 93 extends across the entire width of the apparatus between the plates 41 and 42 so that the lip 94 will be positioned about the hook-shaped portions 95 of the interposers 85 and so that the power bail projections will be appropriately positioned with respect to the downwardly extending right-hand end portions of the interposers 85 at all positions of the carriage 72 transversely of the apparatus.

Each of the vertical transfer members 90 is provided with a slot 109 in the portion of it intermediate the base 75 and upper plate 112 of the carriage 72 for receiving a transfer link 113 individual to it. These transfer links are equal in number to the number of vertical transfer members 90 and to the number of embossments to be formed in Braille cells. The transfer links 113 are pivoted in slots 114 formed in brackets 115 that are in turn mounted on the underside of the upper plate 112. Each of the transfer links 113 is resiliently held against the bottom of its pivot slot 114 by a pin 116 which is biased against the upper surface of the transfer link 113 by a compression spring 117 interposed between a shoulder 118 on the pin 116 and the under surface of a bracket 119 fixed on the upper plate 112 of the carriage 72. The ends of the transfer links 113 remote from the pivot slot 114 are inserted in apertures 120 of control pin actuators 121 under the bottom ends of selector pins 122. These control actuators 121, of which there are six provided equal in number to the number of possible embossments in a Braille cell, are fixed to selector pins 122 and the lower portions of the control pin actuators 121 are reduced in size as indicated at 123 to slide in suitable apertures formed in a bracket 124 mounted on the base 75 of the carriage 72. Positioned beneath the lower end of each of the control pin actuators 121 is a bent flat spring 125 which resiliently seats its actuator 121. Mounted on the upper surface of upper plate 112 is a bracket 126 having six apertures 127 formed in its upper surface for guiding the upper ends of the selector pins 122. The pin actuators 121 and pins 122 may thus be reciprocated vertically in a selected pattern as determined by the code combinations of signals read by the reader 27. As the carriage 72 travels across the web 26, the selector pins 122 carried by the carriage 72 will be associated with each possible Braille cell to be embossed on the web 26.

As may be seen most clearly in FIG. 13 the interposers 85 for the levels 1 to 6 of the code are urged by their respective springs 88 to move to the right and when released by the latches 70 the springs 88 will move the interposers to the right in the slots 91 of their respective vertical transfer members 90 thus moving the lower ends of the interposers 85 that have been released by latches 70 into alignment with the power bail projections 92 on power bail 93. Interposers 85 associated with levels 2 and 3 and 5 and 6 are straight and extend into their particular vertical transfer members 90 whereas the interposers 85 for levels 1 and 4 are bent as indicated at 128 to extend over to the vertical transfer member 90 for their levels. The transfer links 113 are arranged in a radial pattern and extend into the control pin actuators 121 having the selector pins 122 mounted on them. Upon movement of the power bail 93 upwardly after the selective release of interposers 85 the pin actuators 121 and the pins 122 carried by them will be moved upwardly. As the pins are moved upwardly the force applied to them will be regulated by the springs 117 so that after a predetermined amount of travel of the pins 122 the springs 117 may be compressed. Thus, when the pins 122 are moved upwardly they will drive a series of embossing pins 140 selectively upwardly for engagement with the web 26 against a die block 141 and effect the embossing of the web 26.

EMBOSSING PINS AND DIE BLOCK

Figure 2:
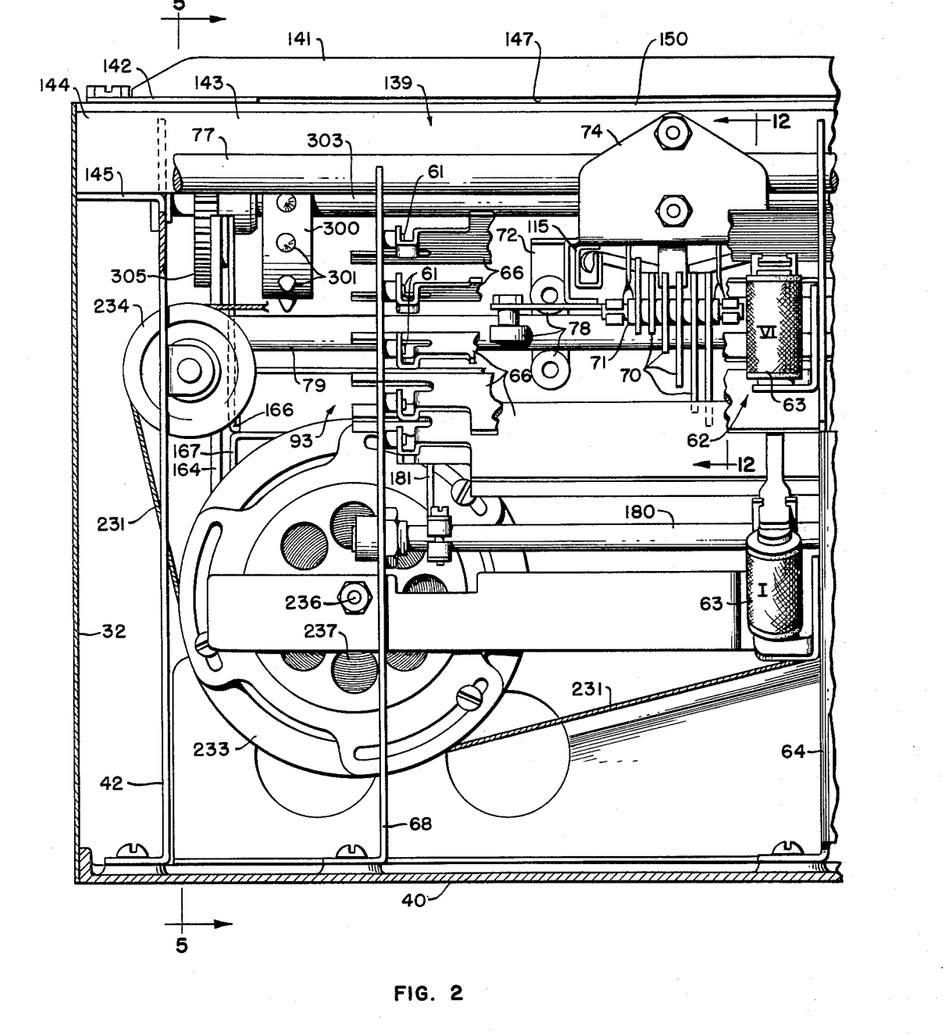
FIG. 2 is a front view of the left-hand side of the apparatus embodying the present invention in which the front cover plate has been removed to show the invention in greater detail.
Figures 3, 4:
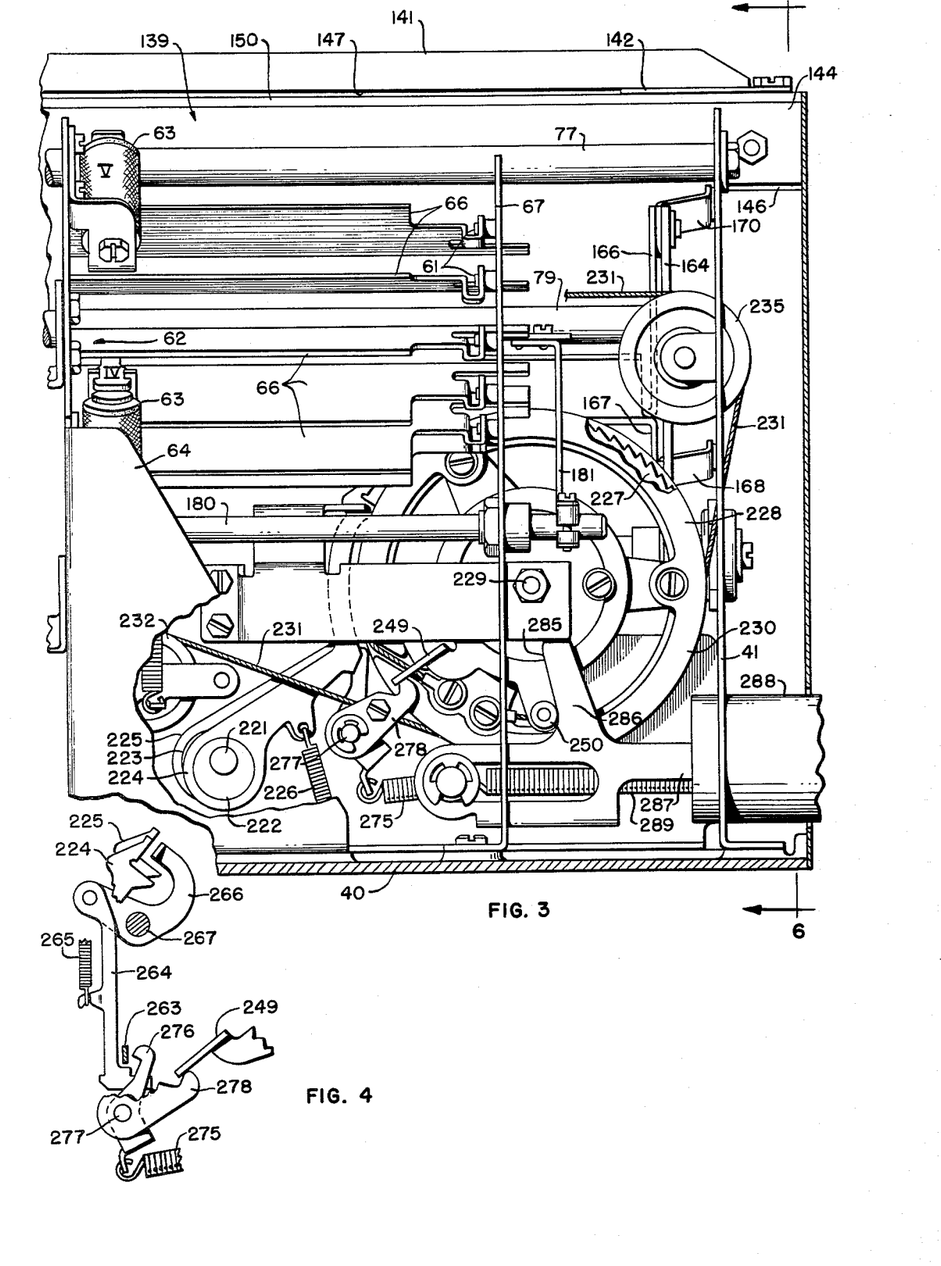
FIG. 3 is a front view of the right-hand side of the invention in which the front cover plate has similarly been removed and when placed to the right of FIG. 1 shows the entire apparatus in front elevation.
FIG. 4 is a fragmentary view of a portion of a carriage return mechanism for returning the carriage to a starting position after it has moved across the web.

As shown in FIGS. 2 and 3 the die block 141 is carried on a pair of spacer members 142 which are in turn mounted on the horizontal flanges of a pair of rails 143 fixed to spacer blocks 144. The spacer blocks 144 are carried on bent-over portions 145 and 146 of side plates 42 and 41. Thus, the die block 141 is mounted in spaced relation to the top of the cabinet 32 and in position to provide a slot 147 through which the web 26 may be fed to associate with the die block 141 and embossing pins 140. In the usual page of Braille writing thirty-seven characters or cells are embossed transversely of a web. Consequently, the die block 141 is provided with thirty-seven groups of six cavities 148 across the apparatus and there are provided an equal number of embossing pins 140.

The groups of embossing pins 140, thirty-seven in number, are slidably mounted in a lower guide plate 149 and an upper guide plate 150 which together with the rails 143 form an embossing pin housing 139. The upper guide plate 150 rests on and is secured to the horizontal flanges of the rails 143 and the lower guide plate 149 is fixed between the vertical flanges of the rails 143. In the operation of the apparatus the group of six selector pins 122 are associated step-by-step with each group of six embossing pins 140 assigned to a Braille cell. When the group of selector pins 122 are in alignment with the group of pins 140 of any individual Braille cell to be embossed across the width of the web 26 those of selector pins 122 which have been selected for operation by the interposers 85 will be forced upwardly to emboss indentations or projections in the web 26. The force with which the pins 140 are moved toward the base die cavities 148 will be controlled by the compression springs 117 associated with the pins 116 carried by the carriage. Thus, when the bail 93 moves to effect an embossing operation and drives selected ones of the selector pins 122 upwardly some of the transfer links 113 may be moved off of the base of the slots 114 in which they are pivotally mounted. As a consequence of this, the force applied to the pins 140 will always be sufficient to insure the full embossing of the web since any resistance met by the pins 140 before they are fully seated will cause a greater compression of springs 117 which in turn will cause more force to be applied to pins 140. As will be apparent by reference to FIG. 12 each of the embossing pins 140 is normally held in the position shown in that figure by a compression spring 151 individual to it which is interposed between the lower surface of the upper embossing pins guide plate 150 and a collar or shoulder 152 formed on the individual pins. Thus, the pins may be reciprocated selectively in the guide plates 149 and 150 and will be retracted to the position shown in FIG. 12 after each embossing operation.

POWER BAIL

As soon as the reader 27 reads a code combination of perforations in the tape 28 the electromagnets 63 will be tripped and simultaneously therewith the power bail controlling clutch 57 (FIG. 7) will be tripped to initiate a cycle of operation of the power bail 93. When the clutch 57 is tripped, it will connect a power bail drive gear 160 (FIGS. 5, 6, and 7) to the shaft 43. The power bail drive gear 160 is in mesh with a driving gear 161 fixed to power bail shaft 162. Fixed to the shaft 162 are a pair of eccentric drive members 163 for driving a pair of drive links 164 that have yokes 165 at their bottom which encircle the eccentrics 163. These links 164 are pivotally connected at their upper ends to upwardly extending arms 166 of the power bail 93. The power bail 93 has a pair of brackets 167 mounted or fixed to it at its ends to which there are pivotally attached a pair of links 168 oscillatable about pivot pins 169 extending from the side plates 41 and 42. These links 168 cooperate with a corresponding pair of links 170 pivoted on the upwardly extending arms 166 of the bail 93 and oscillatable about pivot pins 171 also fixed in the plates 41 and 42. By means of this construction the links 164 in being driven by the eccentrics 163 will impart substantially vertical reciprocation to the power bail 93 due to the arrangement of the links 168 and 170 in a pantograph arrangement.

Electromagnets 63, which are energized under control of the reader 27, will oscillate their respective vanes 66 and consequently the selected latches 70 and the interposer members 85 representing the combination of embossment of the Braille cell to be generated will have been released prior to the time that the eccentric 163 will have driven the power bail 93 upwardly far enough to engage right-hand end portions of the interposers 85. As the links 164 continue to drive the power bail 93 upwardly the power bail projections 92 will engage the right-hand end portions of the interposers 85, the selector pins 122 will engage and actuate selected ones of the embossing pins 140 to drive them upwardly to effect the embossment in the web 26 of the combination representing the Braille character in accordance with the signal sent by the reader 27.

Figure 6:
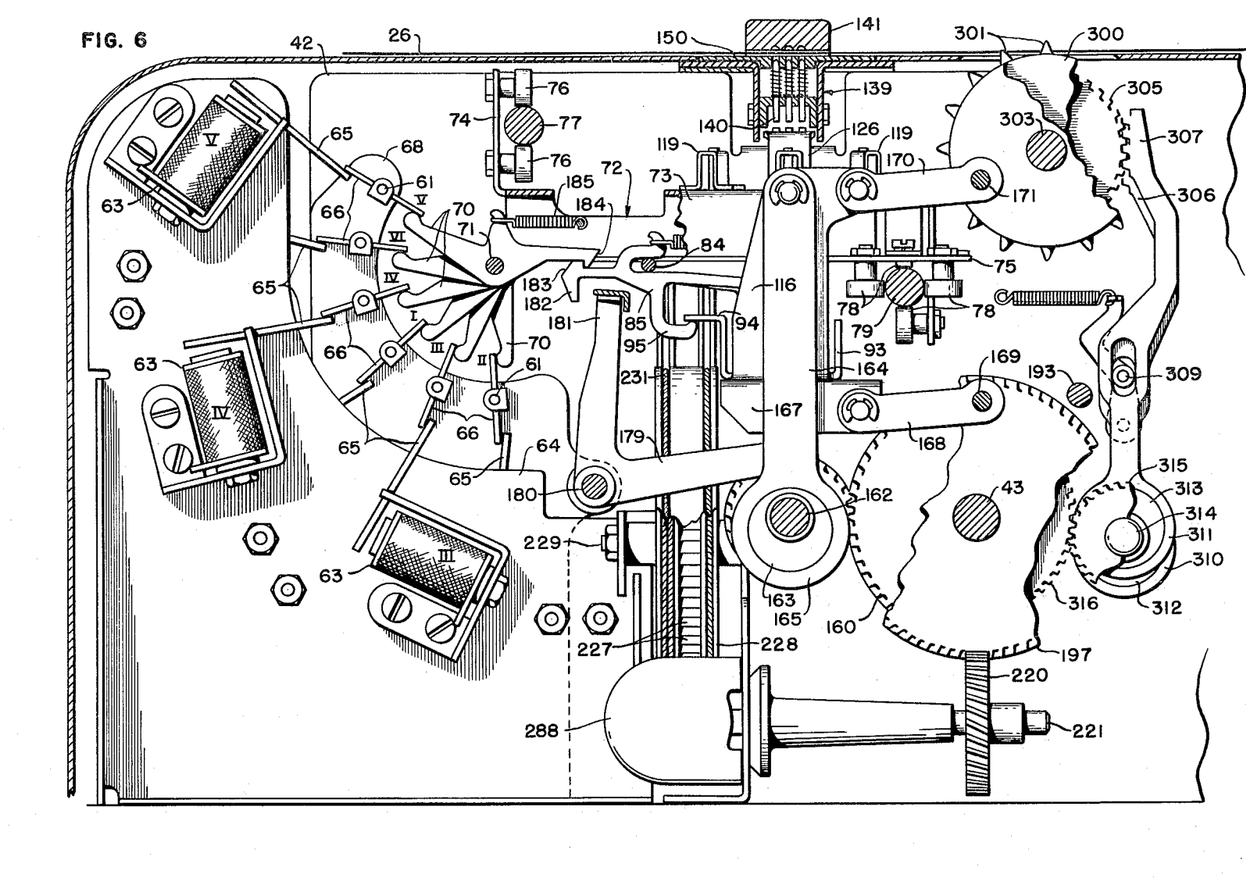
FIG. 6 is a vertical sectional view taken along the line 6—6 of FIG. 3 in the direction of the arrows, and showing in particular the embossing pin actuating mechanism of the present invention.

As the cycle of rotation of the eccentric 163 continues and the power bail 93 is moved downwardly to retract the selector pins 122, a resetting cam 177 on the power bail shaft 162 moves its high portion under a cam roller 178 on a restoring lever 179. Restoring lever 179 is pivotally mounted on a restoring lever shaft 180 which is in turn supported by brackets 67 and 68. As is shown in FIG. 6, when the restoring lever 179 is pivoted about restoring lever shaft 180 a flange on its upwardly extending bail 181 will be moved against a plurality of downwardly extending fingers 182 on the interposers 85 and will thereby serve to push the interposers 85 to the left (FIG. 6) against the action of springs 88. This movement will cause the camming surfaces 183 and 184 on the interposers 85 and the latches 70, respectively, to rock the latches 70 counterclockwise (FIG. 6) against the action of springs 185 while at the same time moving the interposers 85 to the left (FIG. 6). This action will relatch the interposers 85 and the latches 70 thereby restoring the mechanism to the condition shown in FIGS. 6 and 12. Simultaneously with the restoring of the interposers 85 to their set position the lip 94 on the bail 93 will rock the interposers 85 clockwise as viewed in FIG. 12 thereby to retract all of the vertical transfer members 90, the transfer links 113 and selector pins 122 to the position shown in FIG. 12 where they will be in condition to receive a succeeding code signal.

SPACING MECHANISM

Figure 11:
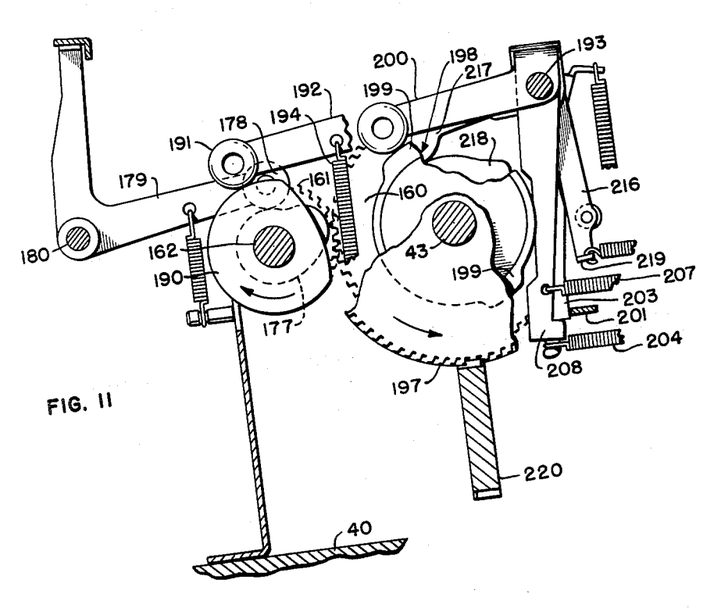
FIG. 11 is a fragmentary vertical sectional view taken along the line 11—11 of FIG. 7 in the direction of the arrows and showing in particular portions of the power bail driving mechanism of the present invention.

Spacing is accomplished by moving the carriage 72, with its group of six selector pins 122, step-by-step across the web 26. In effecting this spacing operation the carriage 72 will align the pins 122 with the embossing pins 140 in the various groups of embossing pins 140. This spacing operation must take place each time a Braille character or cell is embossed upon the web 26. Consequently, the spacing clutch 56 must be tripped once for each cycle of the power bail 93. The power bail shaft 162 has mounted on it a cam 190 with which there is associated a cam roller 191 carried on the end of a spacing cam lever 192 (FIGS. 10 and 11). The spacing cam lever 192 is biased in a counterclockwise direction about a pivot shaft 193 by a contractile spring 194 to hold the cam roller 191 in engagement with the cam 190. The spacing cam lever 192 has a clutch stop arm 195 formed integrally with it which is in blocking engagement with clutch shoe lever 196 of the clutch 56. As has been described hereinbefore in connection with the operation of the power bail 93, clutch 57 is engaged each time a signal is received from the reader 27. Engagement of clutch 57 connects gear 160 to the main drive shaft 43 thereby causing the gear 160 to drive the pinion 161 which in turn drives the power bail shaft 162. As the power bail shaft 162 rotates, cam 190 rotates with it thereby bringing, near the end of its cycle, its low portion under the cam roller 191. This allows spring 194 to rock the spacing cam lever 192 counterclockwise (FIG. 10) about the pivot 193. This moves clutch stop arm 195 out of engagement with the clutch shoe lever 196 and permits clutch 56 to engage and drive a gear 197 with the power shaft 43 through one-half revolution. Since the shaft 162 rotates at twice the speed of shaft 43, the high portion of cam 190 is quickly brought under the lever 192, thus bringing the clutch stop arm 195 into the path of the clutch stop lever 196 thereby preventing a multiple spacing operation. Also, engaged and driven by the power shaft 43 is a cam 198. Cam 198 has high portions 199 spaced 180° apart on its periphery and these high portions will actuate an armature blocking lever 200 to move it to the position shown in FIG. 11 where its lower end is removed from the path of movement of an armature 201 of a magnet 202 which is biased upwardly (FIG. 7) by a spring (not shown). The armature blocking lever 200 has a shoulder 208 which moves under the armature 201 of magnet 202 to hold it in its unactuated position against accidental displacement when the apparatus is in any other than its unoperated condition.

As may be seen more clearly in FIG. 7 the levers 192 and 200 are bail shaped and are oscillatably mounted on the pivot shaft 193. Magnet 202 is actuated upon receipt of character signals from the reader 27; upon being so actuated magnet 202 moves its armature 201 downwardly below the end of an armature blocking lever 203. This lever is urged over the top of the armature 201 by a contractile spring 204 thereby blocking the armature from returning to its unactuated position. Armature blocking lever 203 is pivoted on the pivot shaft 193 in a manner similar to the pivoting of levers 192 and 200 and is normally blocked from rocking under the influence of spring 204 by the armature 201. When magnet 202 is actuated and armature blocking lever 203 is allowed to rock under the action of spring 204, a clutch stop arm 205 is moved out of engagement with a clutch shoe lever 206 of clutch 57 in a manner similar to the movement of clutch stop arm 195. This engages the driven side of clutch 57 with the shaft 43 and causes the gear 160 to revolve with that shaft. This in turn will drive the pinion 161, the shaft 162 and the cam 190. As has been described hereinbefore the revolution of the cam 190 causes the engagement of the clutch 56 which in turn allows shaft 43 to drive the cam 198 and the gear 197.

An armature unblocking lever 216 is provided for restoring the armature to its unactuated position, that is, for rocking the armature blocking lever 203 out of engagement with the upper surface of the armature 201. Armature unblocking lever 216 is pivoted on pivot shaft 193 in a manner similar to levers 192, 200, 203 and has an arm 217 which rides a cam 218 driven with the gear 160. When the cam 218 brings its high portion under the arm 217 the armature unblocking lever 216 is caused to rock clockwise (FIG. 11) thereby bringing a horizontally extending portion 219 into engagement with the armature blocking lever 203 to rock armature lever 203 clockwise (FIG. 11) about the pivot shaft 193 against the action of spring 204. This will restore the spacing mechanism and the power bail mechanism to the condition shown in the drawings after they have gone through a single cycle of operation.

The gear 197 is a beveled gear which meshes with a beveled pinion 220 on a spacing shaft 221. The spacing shaft 221 as shown in FIG. 3 has a pair of eccentrics 222 and 223 mounted on it which drive a pair of spacing pawls 224 and 225 that are biased by springs 226 to engage with teeth 227 of a spacing ratchet 228. The spacing ratchet 228 is rotatable about a stud shaft 229 suitable supported in the cabinet 32 and is fixed to a winding drum 230 to which the ends of a pair of cables 231 are attached. The cables 231, as shown in FIG. 3, are directed around the drum 230 and their lower courses pass over tension rollers 232 to a spring drum 233 (FIG. 2), are wrapped several times around the spring drum 233 and then directed over guide rollers 234. From the guide rollers 234 the cables 231 are directed on an upper course to guide rollers 235 and thence downwardly to the drum 230 to which they are connected. The spring drum 233 is freely rotatable about a shaft 236 and has a driving clock spring 237 attached to its inner periphery and to the shaft 236 which spring 237 will be wound up as the drums 233 and 230 rotate in a clockwise direction.

The pawls 224 and 225 will be reciprocated alternately to engage the teeth 227 and step the drum 230 in a clockwise direction whereby on each cycle of rotation of the shaft 231 both pawls 224 and 225 will engage teeth 227 to step the drum 228 two steps. The cables 231 are suitably attached to the carriage 72 and for each two steps of movement of the drum 228 the carriage 72 will be stepped one character or cell space across the web 26.

Fixed to the drum 230 are a pawl restoring lever arm 249 and a dashpot post 250. Both the arm 249 and post 250 become effective when the carriage is returned to its initial position at the left side of the web 26. As soon as the first spacing operation occurs upon the receipt of the first character signal from the reader 27 the post 250 and arm 249 will move clockwise from the position shown in FIG. 3 with the drum 230.

CARRIAGE RETURN MECHANISM

Figure 8:
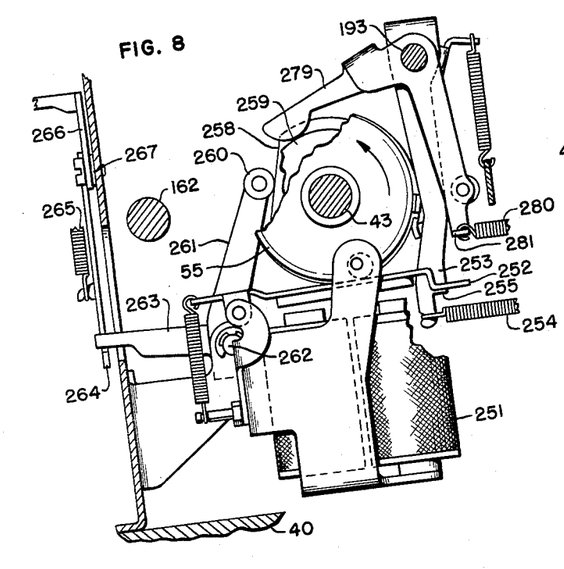
FIG. 8 is a fragmentary vertical sectional view taken substantially along the line 8—8 of FIG. 7 in the direction of the arrows and showing in particular the carriage return mechanism.
Figure 9:
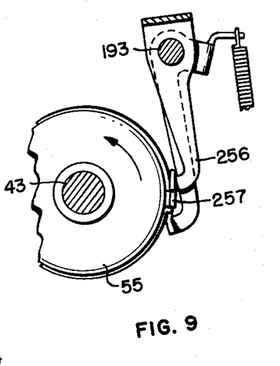
FIG. 9 is a fragmentary vertical sectional view taken substantially along the line 9—9 of FIG. 7 in the direction of the arrows showing some details of a clutch tripping mechanism.

Upon the receipt in the embosser 25 of a signal which calls for a carriage return movement, magnet 251 (FIG. 8) will be energized to attract its armature 252 and thereby initiate a carriage return operation. Armature 252 has a projection extending rearwardly (FIG. 8) which normally blocks an armature blocking lever 253 from rocking movement about the pivot shaft 193 under the action of spring 254. When the armature 252 is attracted by the magnet 251 the projection on the arm 252 drops under the shoulder 255 on the armature blocking lever 253 thereby allowing the armature blocking lever 253 to rock counterclockwise (FIGS. 8 and 9) under the action of spring 254. This passes the projection on the armature 252 under the shoulder 255 thereby holding the armature in its attracted position. The counterclockwise oscillation of the armature blocking lever 253 about the pivot shaft 193 causes a clutch stop armature 256 to be rocked out of the path of a clutch shoe lever 257. This action allows the clutch 55 to engage the shaft 43 which in turn drives the cams 258 and 259 with the power shaft 43. As the cam 258 revolves with the shaft 43, a cam roller 260 drives a bell crank lever 261 and causes it to rock counterclockwise (FIG. 8) about its pivot 262. The horizontally extending arm 263 of the bell crank 261 is thereby driven downwardly (FIGS. 8 and 4) and in so moving the arm 263 drives a link 264 downwardly against the action of spring 265. The link 264 is pivotally connected to an oscillatable pawl disengaging lever 266 which is pivoted on stud pivot 267. As the link 264 is driven downwardly by the arm 263 a laterally extending finger on the oscillatable pawl disengaging lever 266 engages the pawls 224 and 225 and forces them out of the engagement with the teeth 227 on drum 230. At the same time a spring 275 rocks a latch 276 about a stud pivot 277 thereby bringing the latch 276 over the arm 263 to hold it in its actuated position. This causes the oscillatable pawl disengaging lever 266 to keep the pawls 224 and 225 out of engagement with the teeth 227 on the drum 230 until the drum 230 drives the carriage to its extreme left-hand position. Upon disengagement of the pawls 224 and 225 from the teeth 227, the spring 237 becomes effective to drive the drums 230 and 233 counterclockwise to the position shown thereby moving the carriage 72 to the extreme left-hand position. As the drum 230 approaches the position shown in FIG. 3 in its counterclockwise rotation, the lever arm 249 on the drum 230 will engage and actuate a driving member 278 which is attached to the latch 276 to rock the latch 276 to the position shown in FIG. 4 thereby releasing the arm 263 which in turn will release the link 264 and permit the spring 265 to move the oscillatable pawl disengaging level 266 to the position shown in FIG. 4. As the drum 230 is rotating counterclockwise, the cam 259 (FIG. 8) brings its high portion (not shown) under a lever 279 thereby rocking it clockwise (FIG. 8) about the pivot shaft 193 against the action of a spring 280. This action drives an armature unblocking lever 281 to the left (FIG. 8) thereby pushing the armature blocking lever 253 to the left. This moves the shoulder 255 on the armature blocking lever 253 out of the path of travel of the armature 252 and allows the armature 252 to return to its unactuated position as shown in FIG. 8. This in turn holds the armature blocking lever 253 in the position shown in FIG. 8 which causes the clutch stop arm 256 to be held in engagement with the clutch shoe 257 thereby holding the clutch 55 disengaged.

Also simultaneously with the return of the arm 249 to the position shown in FIG. 3 the dashpot post 250 will return to the position shown in FIG. 3 and in so doing will engage a cam face 285 on an arm 286 of a dashpot plunger 287 to drive the dashpot plunger 287 into a dashpot cylinder 288. The camming face 285 is so shaped as to gradually increase the force with which the plunger 287 is driven into the cylinder 288 as the plunger is actuated by the post 250. The plunger is biased to move leftward (FIG. 3) by a spring 289 so that when the carriage 72 is stepped to the right across the face of the web 26 by the spacing mechanism the plunger 287 will be withdrawn from the cylinder 288 and positioned to take up the shock of the carriage 72 in returning to its left-hand position.

LINE FEED

The web 26, which is scored or partially cut to form manifold type pages, must be fed between the open guide plate 150 and the die block 141 while passing over the top of the cabinet 32. This line feed operation is effected by a pair of sprocket wheels 300 (FIGS. 5, 6 and 7) and have teeth 301 formed on them for engagement with feed holes 302 formed on opposite edges of the web 26 as shown in FIG. 1. The feed hole perforations 302 are formed adjacent to the edges of the web 26 and the sprocket wheels 300 are spaced so that the feed pins 301 on them will engage the holes 302. A drive shaft 303 supports and drives the sprocket wheels 300 and is mounted in bearings 304 in the plates 41 and 42. Fixed to the shaft 303, as is most clearly shown in FIGS. 5 and 6, is a driving gear 305 with which there are aligned a pair of driving racks 306 and 307. These racks are each provided with a guide slot 308 into which there extends a guide roller 309 for oscillatably and pivotally supporting the racks 306 and 307 for alternating operative engagement with the teeth of the driving gear 305.

The lower ends of the racks 306 and 307 have driving yokes 310 and 311 formed on them which encircle driving eccentrics 312 and 313, respectively, fixed to a line feed drive shaft 314. The line feed drive shaft 314 is suitably mounted for rotation in the plate 42. The line feed shaft 314 has a pinion 315 fixed to it which is in mesh with a gear 316 mounted on the main drive shaft 43.

Upon receipt of a line feed signal, as represented by a permutative combination of perforations in the tape 28 and in the tape reader 27, a circuit will be completed for energizing a line feed electromagnet 317 which will attract its armature 318 to move an armature lever 319 downwardly with respect to an armature blocking lever 320 which operates in the same manner as the armature blocking lever 253 (FIG. 8) to temporarily latch the armature 318 in its actuated position. The lever 320 operates in the same manner as the lever 253 in that at a later point in the cycle of operation it releases the armature lever 319. When the armature blocking lever 320 is released by the armature lever 319 a spring 321 will rock the blocking lever 320 clockwise about the pivot shaft 193 to trip the clutch 58 thereby to connect gear 316 to the main drive shaft 43 for one-half cycle of rotation. When the gear 316 is connected to the main drive shaft 43 for one-half of a cycle of rotation of the shaft 43 a complete cycle of rotation will be imparted to the pinion 315 thereby to drive the eccentrics 312 and 313 through one complete revolution. Since the yokes 310 and 311 on the racks 306 and 307 will be driven by the eccentrics 312 and 313 the racks 306 and 307 will be alternately engaged with the driving gear 305 and will be reciprocated vertically (FIG. 6) to drive the gear 305 an amount sufficient to feed a fresh line of the web 26 into position under the die block 141, thus to effect line spacing of the web 26. A more complete understanding of the spacing mechanism, carriage return mechanism and line feed mechanism may be had by referring to the patent to W. J. Zenner, No. 2,505,709, mentioned hereinbefore.

FORM FEED-OUT

In order to properly position and space the lines of Braille embossment on the web 26 and to provide the necessary margins at the top and bottom of each section of the manifold web an automatic form feed mechanism is quite useful. With such an automatic mechanism, multiple line feed operations may be effected automatically without the intervention of the operator who is preparing the tape to control the embosser. In other words, after the tape 28 has had a predetermined number of line feed signals perforated in it, the embosser will automatically generate a series of line feed operations although the tape does not have code combinations in it calling for such operations. Thus, the operator of keyboard 31 need not keep track of the number of line spacing operations she has effected in the tape 28.

Figure 15:
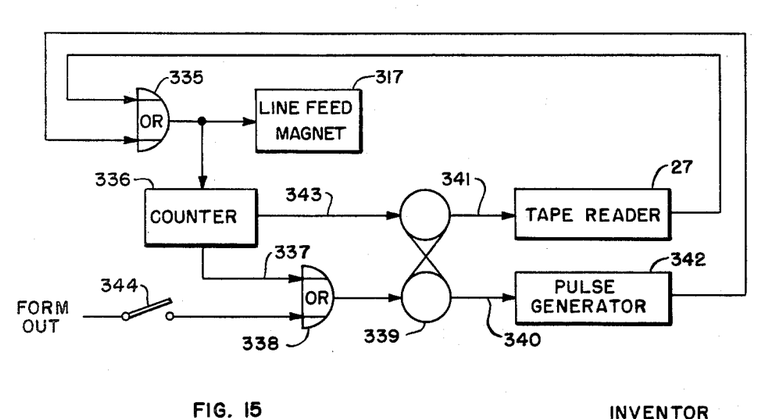
FIG. 15 is a schematic diagram of a control circuit for controlling the feeding of a web being embossed in the present apparatus.

In order to effect this automatic form feed out or multiple line spacing operation at the proper intervals during the operation of the embosser 25 an automatic mechanism is provided for counting line feed signals and automatically causing a form out or form feed-out operation after a predetermined number of lines have been embossed on the web 26. As illustrated in FIG. 15 the tape reader 27 is connected through an OR-gate 335 to the line feed magnet 317 and when the reader 27 reads a code combination of perforations in the tape 28 that is representative of a line feed operation, the tape reader will pulse the line feed magnet to operate it once. Also connected to the output of the OR-gate 335 is a counter 336 which may be of any suitable type that will count the number of times it receives pulses through the OR-gate 335 and after receiving a predetermined number of such pulses representative of the maximum number of lines of embossments to be formed in the web 26 will generate pulses on one of its output leads 337 which is directed through an OR-gate 338 to a flip-flop 339. The flip-flop 339 is of the type which has the quality of maintaining either of two suitable states in its output leads 340 and 341. Upon receipt of a pulse from the counter 336 through the lead 337 and OR-gate 338, the flip-flop 339 will assume a condition such that it will apply power to the lead 340 which is connected to a pulse generator 342 of any suitable type capable of generating pulses of the same type as the pulse generated by the tape reader 27 in reading a line feed code combination in the tape 28. At the same time the flip-flop 339 will interrupt the power supply of the reader 27 thus temporarily stopping the reading of the tape 28. Thus, the flip-flop 339 will activate and maintain the pulse generator 342 activated to feed a series of pulses through the OR-gate 335 with line feed magnet 317 and the counter 336. The counter 336 is arranged so that upon receiving a total number of pulses representative of the desired number of lines of embossments on a section of the web 26 plus the number of line feed signals necessary to feed the web to a new starting position where a section of it will be in position under the die block 141 it will pulse the flip-flop 339 to cause it to assume its opposite stable state thereby to disable the pulse generator 342 and stop the feed of line feed signals. The counter 336 in pulsing the flip-flop 339 will transmit a pulse over a connecting lead 343 to reverse the flip-flop 339 and reinitiate operation of the tape reader 27.

In order that an operator in charge of the embosser 25 may feed the web 26 out of the embosser 25, if the supply of tape 28 in the tape reader 27 is exhausted or if there are no more control perforations in the tape 28, means are provided as represented by the switch 344 to apply a pulse through the OR-gate 338 under the operator's control to effect a form-out operation.

SECOND EMBODIMENT

Figure 16:
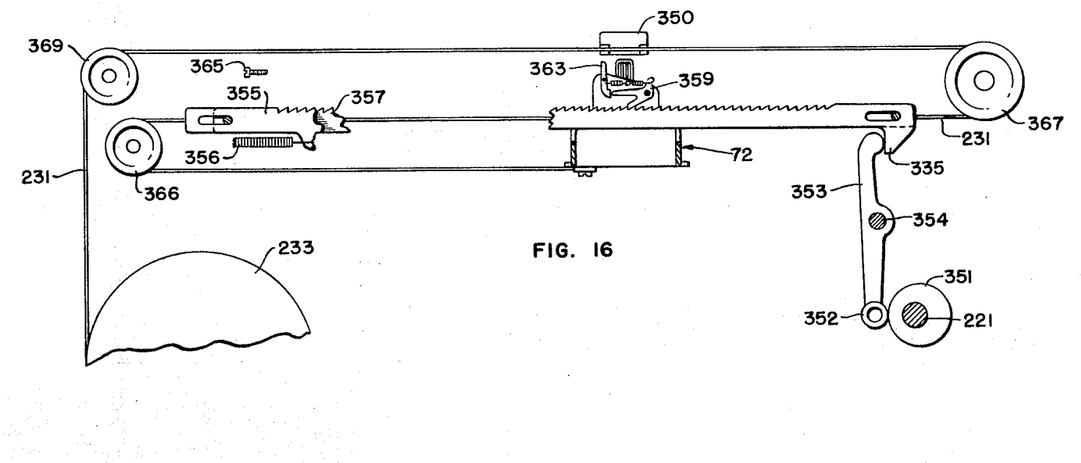
FIG. 16 is a fragmentary diagrammatic view of a second embodiment of the invention which differs from the previously described embodiment in the provision of a different character spacing mechanism and a different type of embossing pin and die arrangement, only those parts of the second embodiment being illustrated which are different from the cooperating parts illustrated in the first described embodiment.
Figure 17:
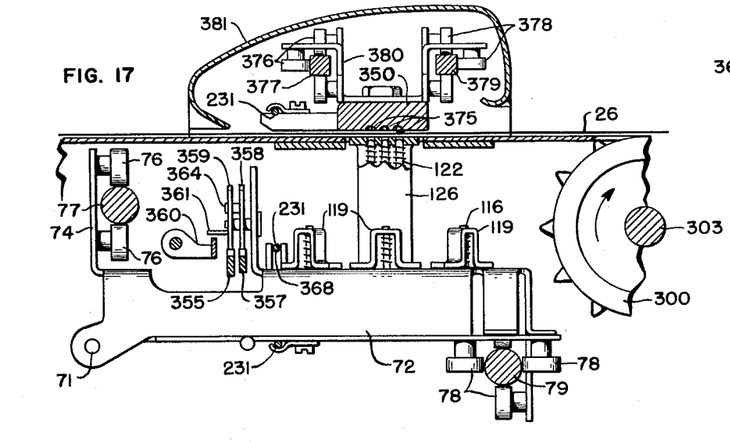
FIG. 17 is a fragmentary vertical sectional view taken substantially along the line 17—17 of FIG. 16 in the direction of the arrows showing details of construction of a traveling die block made in accordance with the second embodiment.
Figure 18:
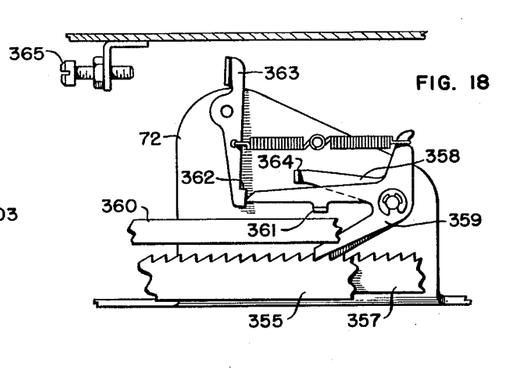
FIG. 18 is a fragmentary front elevational view of a portion of the apparatus shown in FIG. 16 on an enlarged scale.

A second embodiment of the present invention is shown in FIGS. 16, 17 and 18 where the embossing pin housing 139, the pins 140 and the die block 141 have been replaced by a traveling die block 350. The carriage 72 has been retained in exactly the same form as depicted in the first embodiment described hereinbefore, however, in this embodiment the pins 122 actually do the embossing instead of driving a second set of pins which do the embossing. Referring now specifically to FIG. 16 it may be seen that the shaft 221 drives a cam 351 instead of driving the feed pawls 224 and 225. The operation of the shaft 221 is, however, controlled in exactly the manner as previously described. As the cam 351 is revolved by the shaft 221, it drives a cam follower roller 352 on a lever 353 thereby causing lever 353 to rock clockwise (FIG. 16) about its pivot 354. This in turn drives a traveling rack 355 to the right as seen in FIG. 16 against the action of a spring 356. Located behind the traveling rack 355 is a stationary rack 357 which cooperates with the traveling rack 355 to control the movement of the carriage 72 and traveling die block 350. As the traveling rack 355 (FIG. 18) moves to the right under the action of cam 315 the carriage 72 will be driven to the right and a pawl 358 will drop into one of the teeth in the stationary rack 357. As the traveling rack 355 moves to the left under the action of spring 356, a pawl 359 will fall into the next tooth on the rack 355 thereby resetting the pawl and rack mechanism for the next advancing step. A carriage return bail 360 (FIGS. 17 and 18) extends across the width of the machine and is driven through a link (not shown) by the finger 263 which has been described hereinbefore and which is shown in FIGS. 4 and 8 of the preferred embodiment so that when a carriage return signal is received from the tape reader the carriage return bail 360 will be driven upwardly (FIGS. 17 and 18) and will engage a tab 361 on the pawl 359. Pawl 359 will in turn become latched up on a latching shoulder 362 (FIG. 18) on a carriage return latch 363 and, therefore, pawl 359 will be held out of engagement with the teeth of the traveling rack 355. When it is raised in this manner the pawl 359 will strike a tab 364 on the pawl 358 and will, therefore, cause pawl 358 to be raised out of engagement with the teeth on the stationary rack 357. This in turn will allow the carriage 72 and the traveling die block 350 to return to their starting position under the action of a spring 237 located inside the spring drum 233 in the manner described previously. After the carriage 72 has reached its starting position the carriage return latch 363 will strike a set screw 365. This causes the latch 363 to become disengaged from the pawls 358 and 359 and allows them to again fall into the teeth of the racks 355 and 357.

One end of the cable 231 is attached to the base of the traveling carriage 72 and the cable 231 is directed around a guide roller 366 to form a bottom course of cable. From the guide rollers 366 a second or intermediate course of the cable is directed back to a guide roller 367. This second or intermediate course of the cable is not attached to the carriage 72 but is guided in a notch 368 (FIG. 17) on the carriage 72. The upper course of the cable 231 is fixed to the traveling die block 350 and is directed over a guide roller 369 and back to the spring take-up drum 233. In this embodiment of the invention the power driven drum 230 is eliminated and due to the arrangement of the various courses of the cable and their points of attachment to the carriage 72 and traveling die block 350, the die block 350 and carriage 72 will move as a unit transversely of the web to be embossed.

In this embodiment of the invention the carriage 72 travels on guide rods 77 and 79 in the same manner as in the first described embodiment of the invention. However, since a die block 350 having only six die cavities 375 formed in it is provided and this die block 350 consequently travels across the web to be embossed a pair of guide rods 377 and 379 are provided for supporting the carriage for movement. The die block 350 has a support bracket 380 attached to its upper surface on which there are mounted guide rollers 376 and 378 for cooperation with the rods 377 and 379. The rods 377 and 379 may be supported on the side plates 41 and 42 in a manner similar to that in which the guide rods 77 and 79 were supported in those plates. In this embodiment of the invention a suitably shaped enclosure 381 is provided to enclose the moving parts associated with the movable die block 350.

OPERATION

In using the present apparatus for the preparation of Braille copy an operator may operate the keyboard 31 to effect the simultaneous operation of a monitor copy 30 and a perforated tape. The tape will have perforated in it under control of the keyboard 31 permutations of perforations representing characters in the Braille language and the characters to be embossed in Braille will appear on the monitored copy. Tape thus prepared may be fed to the tape reader 27 to control the embosser 25. Obviously, the code combinations perforated in the tape could also be transmitted telegraphically to a reperforator of any suitable type which would then prepare a duplicate of the tape 28 at a remote point. At this remote point there could be provided an embosser 25 and a tape reader 27 so that Braille copy could be prepared at a number of remote stations without being generated and prepared by a tape preparation machine such as the machine designated 29.

The tape reader 27 will on reading the tape 28 complete connection to the electromagnets 63 in the embosser 25 to energize these electromagnets. Upon energization of the electromagnets they will rock their respective vanes 66 from the position shown in FIG. 6 selectively to actuate the latches 70 of the carriage 72. It will be assumed at this time that the carriage 72 is in its initial or starting position adjacent to the left edge of the web 26. As the latches 70 are rocked counterclockwise (FIG. 6) they will release their respective interposers 85 and those interposers which have been selectively released in accordance with the code combination read by the reader will move to the right as viewed in FIG. 12 to carry their right ends over the projections 92 of the power bail 93.

Each code combination of signals read by the reader 27 will also initiate a cycle of operation of the power bail 93. The interposers 85 will be released by their latches 70 prior to the time that the projections 92 move upwardly enough to engage the lower right ends of the interposers. Consequently, the interposers 85 which have been selected for operation will be in the position as illustrated by the dotted line in FIG. 12 where they will be aligned with the projections 92. As the power bail 93 moves upwardly and rocks the right ends of those interposers 85 that have been selected for operation, counterclockwise about guide post 84 (FIGS. 6 and 12) the upper surface of the interposers 85 will engage and actuate the vertical transfer members 90 individual to them. The upward movement of the vertical transfer members 90 will cause the transfer links 113 to pivot about the base of the slots 114 in the bracket 150. The inner ends of the transfer links 113 are positioned within the apertures 120 of the control pin actuator 121 so that the movement imparted to the links 113 will be transferred to the actuators 121 individual to the operated transfer links 113. As the control pin actuators 121 are thus driven upwardly transfer links 113 will also drive the selector pins 122 upwardly and, consequently, one or more of the embossing pins 140 will be driven upwardly against the action of their individual springs 151 to engage the web 26 and form embossments on the web 26 to a height as controlled by the die cavities 148 in the die block 141. As the pins 140 seat themselves against the web 26 and are blocked from further movement by the base of the cavities 148 the continued upward movement of the vertical transfer members 90 under the influence of the power bail 93 will cause the transfer links 113 to move off of the seat of the slot 114 and to drive the pins 116 upwardly thereby compressing the springs 117. This assures the full seating of the pins 140 in the cavities 148 while eliminating the necessity of delicate adjustments in the amount of travel of the linkages that are actuated by the power bail 93 and in turn drive the embossing pins 140.

The power bail 93 had its reciprocatory cycle initiated upon the tripping of the clutch 57 by the energization of electromagnet 202 under control of the reader 27. When the clutch 57 initiates a cycle of operation of the power bail 93, it effects this operation by connecting gear 160 to main drive shaft 43 thereby to drive the shaft 162 and the eccentrics 163 through one cycle. The eccentrics 163 in rotating through one complete cycle will move the drive links 164 upwardly from the position such as shown in FIG. 6 and then back down to the position shown. As the links 164 return to their normal position they will retract the power bail 93 to the position shown in FIG. 12. As the power bail 93 moves back to the position shown in FIG. 12 the horizontally extending lip 94 on it will engage the hook shaped portion 95 of the interposers 85 and will pull the interposers down thereby restoring the vertical transfer members 90, transfer links 113, and selector pins 122 to the position shown in FIG. 12. During the retraction of the power bail 93 to its unoperated position the cam 177 (FIG. 11) on the shaft 162 will rock the restoring lever 179 counterclockwise as shown in FIG. 6 to carry the flange on it into engagement with the fingers 182 on the interposers 85 to the left (FIG. 6). This will cause the camming surface 183 on the interposers 85 to engage the camming surface 184 on the latches 70 that had been tripped and will thereby restore the interposers 85 to the condition in the drawings. The flange on the upwardly extending leg 181 of the lever 179 and the lip 94 on the power bail 93 extend substantially the entire width of the machine and thus are in position to restore the mechanism regardless of the position of the carriage 72 transversely of the web 26.

Near the end of the cycle of the rotation of the shaft 162 the cam 190 will permit the spacing cam lever 192 to rock counterclockwise (FIG. 11) about its pivot shaft 193 thereby to trip the spacing clutch 56 (FIG. 10). When the spacing clutch 56 is tripped it will initiate a cycle of rotation of the spacing shaft 221 by connecting the gear 197 to the main drive shaft 43. When gear 197 is connected to the shaft 43 for half of a revolution of the shaft 43 it will drive the gear 220 through a complete cycle of rotation thereby to actuate the shaft 221 which in rotating through a complete cycle of rotation will drive pawls 224 and 225 (FIG. 3) and impart two steps of rotation to the winding drum 230 thereby to step the carriage 72 across the web 26 one Braille character or cell space. This operation occurs each time the reader 27 reads any code combination in the tape 28 except those code combinations representative of line feed or carriage return. When either the carriage return or line feed signal is read by the reader 27, the power bail will not be actuated. Each time a spacing operation occurs the cables 231 will step the carriage 72 and will also impart a step of rotation to the spring drum 233 to store energy in the spring 237 for returning the carriage 72 to its left-hand or starting position upon the receipt in the embosser of a carriage return signal. As the spacing drum 230 steps out of its normal position as shown in FIG. 3 to a position where the lever arm 249 is disengaged from the driving member 278, thus, preparing the apparatus for a carriage return operation.

In preparing the tape 28 and monitored copy 30 the operator, after operating the keyboard 31 to prepare tape and the monitored copy in a manner representative of a complete line of Braille characters or cells, will operate a key on the keyboard 31 to effect a carriage return operation of the printing portion of the apparatus and also to perforate a code combination of holes in the tape 28 assigned to the carriage return operation. When the tape reader 27 reads a carriage return code combination in the tape 28 the carriage return clutch 55 will be actuated to initiate the carriage return operation. Energization of the carriage return magnet 251 in response to the reading of a carriage return combination in the tape, will trip the clutch 55 to connect the main drive 43 to the cams 258 and 259 (FIG. 8) to drive these cams through a half cycle of rotation. When cam 258 rotates to a position where its high portion moves into association with the cam roller 260, ball crank lever 261 will be rocked about its pivot 262 thereby to move its arm 263 downwardly (FIG. 4) to pull link 264 downwardly and consequently to rock the oscillatable power engaging lever 266 counterclockwise (FIG. 4). The lever 266 will disengage the pawls 224 and 225 from the ratchet wheel 228 and will be latched in its actuated position until the drum 230 is returned to the position shown in FIG. 3. In returning to the position shown in FIG. 3 the drum 230 will carry the arm 249 into engagement with the driving member 278 to unlatch the pawls 224 and 225 and permit them to reengage with the teeth 227 on the ratchet 288 in condition to initiate further spacing operations. As the drum returns to its home position as shown in FIG. 3, its momentum will be checked with the cooperation of the pin 250 with the dashpot plunger 287 moving in the dashpot cylinder 288.

Line feeding of the web 26 is effected each time the reader 27 reads a line feed signal in the tape 28. This operation is effected by energizing the line feed electromagnet 317 to actuate the line feed clutch 58 which will cause the line feed gear 316 (FIG. 5) to be driven through a half cycle of rotation thereby to drive line feed shaft 314 through a single cycle of operation. Through the eccentrics 312 and 313 the line feed pawls 306 and 307 will be actuated and will drive shaft 303 to advance the web 26 longitudinally through the embosser.

As described in connection with the circuit schematic shown in FIG. 15 the counter 336 will count the line feed operations that are initiated under control of the tape 28 and will automatically interupt operation of the tape reader 27 and cause the completion of the feeding of a section of the web 26 through the embossing die section of the machine to present the proper area of the next section of the web to the embossing die.

Although only two embodiments of the invention are shown in the drawings and described in the foregoing specification, it will be understood that the invention is not limited to the specific embodiments described, but is capable of modification and rearrangement and substitution of parts and elements without departing from the spirit of the invention.

What is claimed is:

1. A mechanism for receiving externally generated permutative signals representative of Braille cells and for converting such signals into embossments in a web comprising:

a die block;
    a plurality of pins for cooperation with the die block to form the embossments in the web;
    a plurality of movable vanes extending substantially the entire width of the web to be embossed;
    means for holding the vanes in one position;

signal receiving means for receiving the character representing signals and for moving permutative combinations of the vanes to a second position in accordance with the signals received;
a plurality of interposers normally held in a first position for release to a second position by the vanes when the vanes are moved to their second position;
power means for engaging those interposers which have been released by the vanes and for moving those interposers to a third position;
a plurality of pin actuator means each individual to one of the pins and individual to one of the interposers for actuation by those interposers which have been released by the vanes as the interposers are moved from their second position to their third position by the power means to move a permutation combination of the pins into cooperative engagement with the die block to form embossments in the web; and
spacing means for moving the interposers and the punch pin actuating means step-by-step transversely across the web to effect character spacing for the Braille copy.

2. A mechanism for receiving permutative signals representative of Braille cells and for translating such signals into embossments in a web comprising:
a die block;
a plurality of pins for cooperation with the die block to form the embossments in the web;
a plurality of movable vanes extending substantially the entire width of the web to be embossed;
means for holding the vanes in one position;
signal receiving means for receiving the character representing signals and for moving permutative combinations of the vanes to a second position in accordance with the signals received;
a traveling carriage;
a plurality of slotted members slidably mounted in the carriage and attached to the pins;
a plurality of interposers slidably and pivotally mounted in the carriage and spring biased toward a selected position;
a plurality of spring urged latches pivotally mounted in the carriage for restraining the interposers from movement to their selected positions and positioned for actuation by the vanes when the vanes are moved to their second position to release selected ones of the interposers for movement to their selected positions;
a plurality of vertical transfer members each having a slot in its upper portion and each having a slot in its lower portion through which one of the interposers travels when the interposer moves to its selected position;
a plurality of pivoted transfer links each extending through the slot in the upper portion of one of the vertical transfer members and through the slot in one of the slotted members to form a yieldable connection between the vertical transfer member and the slotted member;
a power bail extending substantially across the width of the web to be embossed for engaging those interposers which have moved to their selected positions, for raising those interposers thereby causing the pins to cooperate with the die block to form an embossment in the web and, after having caused the pins to cooperate with the die block, for lifting the transfer links off of their pivots thereby insuring the full cooperation of the pins with the die block; and
spacing means for moving the carriage, which carries the interposers, the latches, the vertical transfer members and the transfer links, transversely across the width of the web to effect spacing for the Braille copy.

3. An embossing machine for embossing Braille characters on a web in page form comprising:
a plurality of pins equal in number to and arranged in a pattern corresponding to the individual embossments which make up a Braille cell for causing the embossment of the web;
a plurality of slotted members attached to said pins;
a plurality of pivoted transfer links each individual to one of the pins and each extending through the slot in one of the slotted members;
a plurality of slidable vertical transfer members each individual to one of the transfer links, each having a slot in its upper portion for receiving one of the transfer links and each having a slot in its lower portion;
a plurality of interposers each individual to one of the vertical transfer members, each slidably mounted in the slot in the lower portion of a vertical transfer member and each spring biased to move from a latched position into a selected position;
a plurality of latches each individual to one of the interposers for holding the interposers in their latched position;
a plurality of movable vanes each individual to one of the latches for unlatching the latches from the interposers thereby allowing the interposers to move through the slots in the lower portions of the vertical transfer members from their latched position to their selected position;
signal responsive means for receiving a signal representative of a Braille character and for permutatively moving the vanes in accordance with the signal received;
a power bail for engaging those interposers which have moved to their selected positions and for moving those interposers and their associated vertical transfer members, transfer links and pins thereby causing the pins to effect the embossing of the web; and
means for moving the pins, the transfer links, the vertical transfer members and the interposers step-by-step to effect character spacing for the Braille copy.

4. An embossing machine for preparing Braille copy on a web in page form comprising:
an embossing die member extending across the web and having a plurality of groups of embossing die cavities wherein each group has a number of cavities equal to the maximum number of embossments in a Braille cell and wherein the number of groups in the series is equal to the number of Braille characters or cells that the web will accommodate across each line of embossments;
an embossing pin housing extending across the width of the web to be embossed and having a plurality of groups of embossing pins movably mounted therein and each group of pins being aligned with and equal in number to one of the groups of cavities in the embossing die;
a selector carriage movable step-by-step into sequential association with each group of embossing pins;
a plurality of selector pins reciprocally mounted in said carriage and equal in number to the number of embossing pins in each of the groups of embossing pins;
signal controlled means for conditioning said selector pins for permutative operation at each position of the carriage in its movement; and
an actuator means for simultaneously actuating all of the conditioned selector pins to cause said conditioned selector pins to engage and operate embossing pins in a group of embossing pins and to drive the embossing pins to cooperative relationship with the embossing die to emboss on the web a Braille cell or character corresponding to the signal received.

5. Apparatus according to claim 4 wherein the signal controlled means release interposer members mounted on the carriage to condition the selector pins and wherein the actuator members extend across the width of the web.

6. A signal responsive mechanism for embossing Braille cells corresponding to received signals on a web comprising:
- a frame;
- means mounted on the frame for supporting a web in an embossing position;
- a traveling die block;
- a plurality of embossing pins for cooperating with the die block to form embossments in the web;
- signal controlled means for permutatively conditioning selected ones of the embossing pins for actuation under control of the signal received;
- actuator means for simultaneously urging all of the embossing pins which have been conditioned by the signal controlled means into engagement with the die block to emboss a Braille cell on the web according to the signal received; and
- spacing means for simultaneously moving the die block, the embossing pins and the signal controlled means step-by-step transversely with respect to the web, the web supporting means and the frame to effect character spacing for the Braille copy to be produced.

7. A mechanism for embossing Braille cells on a web comprising:
- a frame;
- means mounted on the frame for supporting a web in an embossing position;
- a traveling die block;
- a plurality of embossing pins for cooperation with the die block to form embossments in the web;
- signal receiving means for receiving permutation code signals and converting the signals into permutations of mechanical movements;
- selector means for conditioning selected ones of the embossing pins for actuation according to the permutations of mechanical movements;
- actuator means for simultaneously urging all of the embossing pins which have been conditioned by the selector means into cooperative engagement with the die block to form embossments in the web; and
- spacing means for simultaneously moving the die block, the embossing pins and the selector means step-by-step with respect to the web, the web supporting means and the frame to effect character spacing for the Braille copy.

References Cited by the Examiner
UNITED STATES PATENTS

| Number | Date | Name | Class |
|---|---|---|---|
| 329,675 | 11/1885 | Perkins. | |
| 422,614 | 3/1890 | Nolan | 197—6.1 |
| 477,062 | 6/1892 | Orndorff | 197—6.1 |
| 521,397 | 6/1894 | Wait | 197—6.1 |
| 761,179 | 5/1904 | Pilsatneeks | 197—19 |
| 776,103 | 11/1904 | Barron | 197—32 |
| 854,187 | 5/1907 | Watson | 197—6.1 |
| 958,778 | 5/1910 | Smith | 197—22 |
| 977,237 | 11/1910 | Swindler | 197—6.1 |
| 1,141,651 | 6/1915 | O'Regan | 197—6.1 |
| 1,264,014 | 4/1918 | Chinnock | 197—6.1 |
| 1,329,087 | 1/1920 | Lallie | 197—6.1 |
| 1,753,991 | 4/1930 | Langford | 197—19 |
| 1,767,247 | 6/1930 | Kurowski et al. | 197—6.1 |
| 1,832,683 | 11/1931 | Atkinson et al. | 197—6.1 |
| 1,953,307 | 4/1934 | Naumburg | 197—6.1 |
| 2,473,437 | 6/1949 | Mallina | 234—43 X |
| 2,986,255 | 5/1961 | Gossino et al. | 197—16 |
| 3,016,781 | 1/1962 | Beaverson | 234—43 X |

FOREIGN PATENTS

| Number | Date | Country |
|---|---|---|
| 179,558 | 5/1922 | Great Britain. |
| 611,396 | 10/1960 | Italy. |

References Cited by the Applicant
UNITED STATES PATENTS

| Number | Date | Name |
|---|---|---|
| 1,018,519 | 2/1912 | Potts. |
| 1,105,920 | 8/1914 | Potts. |
| 1,832,160 | 11/1931 | Vischer. |
| 2,680,507 | 6/1954 | Frey et al. |

ROBERT E. PULFREY, *Primary Examiner.*

EDGAR S. BURR, *Assistant Examiner.*